United States Patent [19]

Yabe et al.

[11] Patent Number: 4,786,866

[45] Date of Patent: Nov. 22, 1988

[54] METHOD AND APPARATUS FOR POWER STEERING

[75] Inventors: Hideo Yabe, Hiki; Ichiro Koike, Higashimatsuyama, both of Japan

[73] Assignee: Jidosha Kiki Co., Ltd., Tokyo, Japan

[21] Appl. No.: 624,640

[22] Filed: Jun. 26, 1984

[30] Foreign Application Priority Data

Jul. 11, 1983 [JP] Japan ............................ 58-125926

[51] Int. Cl.⁴ .......................................... B62D 5/04
[52] U.S. Cl. ........................ 324/158 MG; 340/52 R; 340/60; 340/648; 364/424.03
[58] Field of Search ................ 324/158 R, 158 MG; 417/63; 73/118, 862.35, 168; 340/59, 60, 626, 52 R, 648, 665; 364/424, 431.01, 431.03, 431.04, 431.11; 318/489, 490; 361/23

[56] References Cited

U.S. PATENT DOCUMENTS

| 3,064,162 | 11/1962 | Savell | 318/490 |
| 3,809,985 | 5/1974 | Krause et al. | 318/490 |
| 3,934,239 | 1/1976 | Mason et al. | 340/648 |
| 4,345,660 | 8/1982 | Miller | 340/52 R |
| 4,489,551 | 12/1984 | Watanabe et al. | 417/63 |
| 4,567,413 | 1/1986 | Yabe et al. | 364/185 X |

FOREIGN PATENT DOCUMENTS

| 2657843 | 6/1978 | Fed. Rep. of Germany | 73/862.35 |
| 8111134 | 12/1982 | France | |
| 58-53562 | 3/1983 | Japan | |
| 63265 | 4/1984 | Japan | 318/489 |
| 2102130 | 1/1983 | United Kingdom | 340/365 |

Primary Examiner—Jerry Smith
Assistant Examiner—Stephen M. Baker
Attorney, Agent, or Firm—Townsend & Townsend

[57] ABSTRACT

The operating condition of a power steering device for use in a motor car of the type including a steering mechanism driven by a electric actuator is confirmed by supplying test current to the electric actuator before starting the motor car and then detecting the state variation of the power steering device caused by the test current. The electric actuator may comprise a combination of an electric motor and an oil pump driven thereby, or an electric motor directly coupled to a steering mechanism.

14 Claims, 5 Drawing Sheets

METHOD AND APPARATUS FOR POWER STEERING

BACKGROUND OF THE INVENTION

This invention relates to a method and apparatus for power steering.

Recently, the number of cars equipped with power steering devices has increased yearly. Such cars can be steered with a small and substantially constant steering power in a speed range of from low speed running to high speed running which is effective to decrease drivers fatigue.

However, a driver of a car equipped with a power steering device becomes accustomed to a light steering so that, when the power steering device becomes faulty there is a danger for the driver to drive the car without being aware of the fault. With the prior art power steering device, the driver can judge whether the power steering device is normal or not in accordance with his steering feeling only after running over a certain distance.

SUMMARY OF THE INVENTION

It is therefore an object of this invention to provide a novel method and apparatus for power steering capable of confirming whether the power steering device is faulty or not before the car is started.

According to one aspect of this invention, there is provided a method of confirming an operating condition of a power steering device for use in a car which is controlled by controlling the number of revolutions of a motor driven oil pump delivering pressurized oil to the power steering device, the method comprising the steps of temporarily operating the motor before starting the car, and monitoring the magnitude of current flowing through the motor.

According to another aspect of this invention, there is provided a power steering apparatus of a motor car having a steering mechanism driven by an electric actuator, the power steering apparatus including control means for supplying test current to the actuator before starting the motor car for testing the power steering apparatus, and means for confirming whether the power steering apparatus operates correctly or not in accordance with state variation of the power steering apparatus caused by the test current, the state variation of the steering apparatus being a variation in electric current flowing through the electric actuator. The apparatus includes means for stopping generation of the test current when the state variation is normal and when normal operation of the power steering device has commenced.

DESCRIPTION OF THE PREFERRED EMBODIMENT

Figure 1:
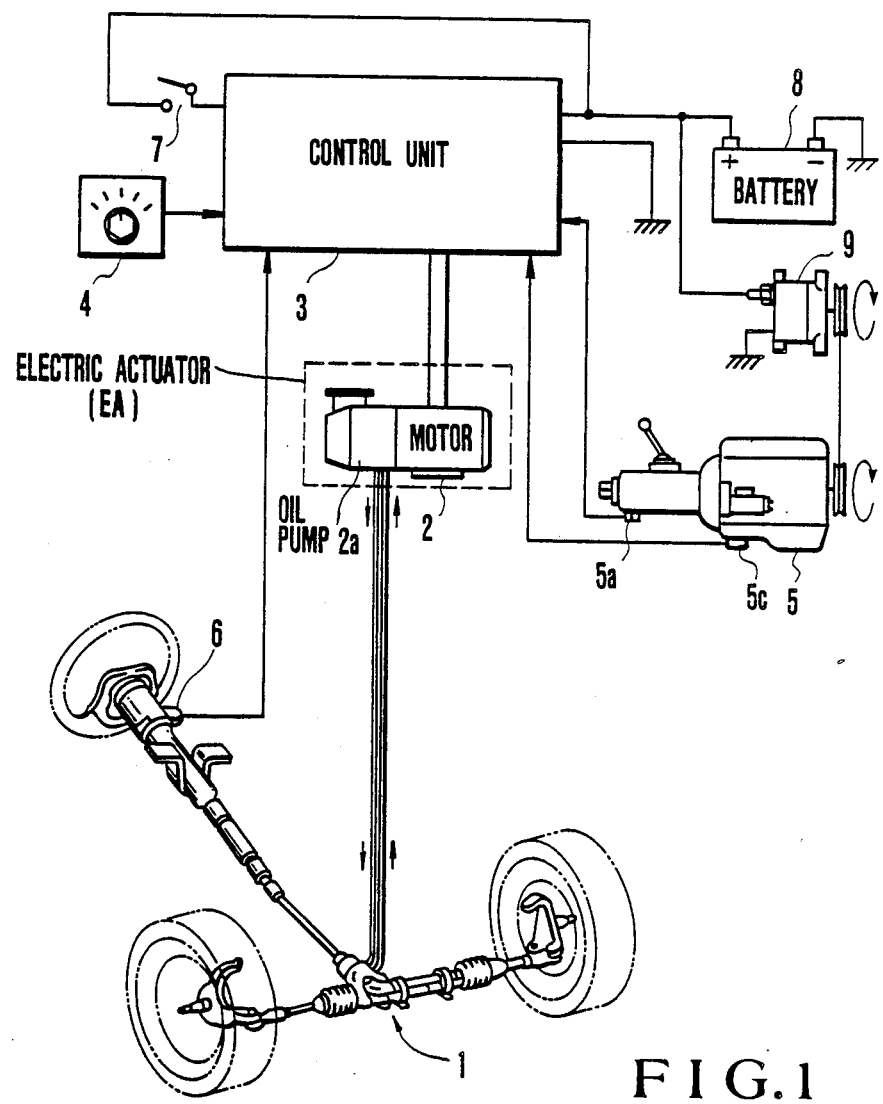
FIG. 1 is a diagrammatic representation showing the construction of a power steering device embodying the invention.

The steering device shown in FIG. 1 comprises a steering unit 1, an electric actuator EA, in this example, constituted by an oil pump 2a driven by an electric motor 2, a control unit 3, a selection switch 4 for selecting steering modes, an internal combustion engine 5 for driving a car, not shown, a speed sensor 5a sensing the speed of the engine, an engine sensor 5c sensing the operation of the engine, a steering sensor 6, an ignition switch 7, a battery 8 and an electric generator 9 driven by the engine 5.

Figure 2:
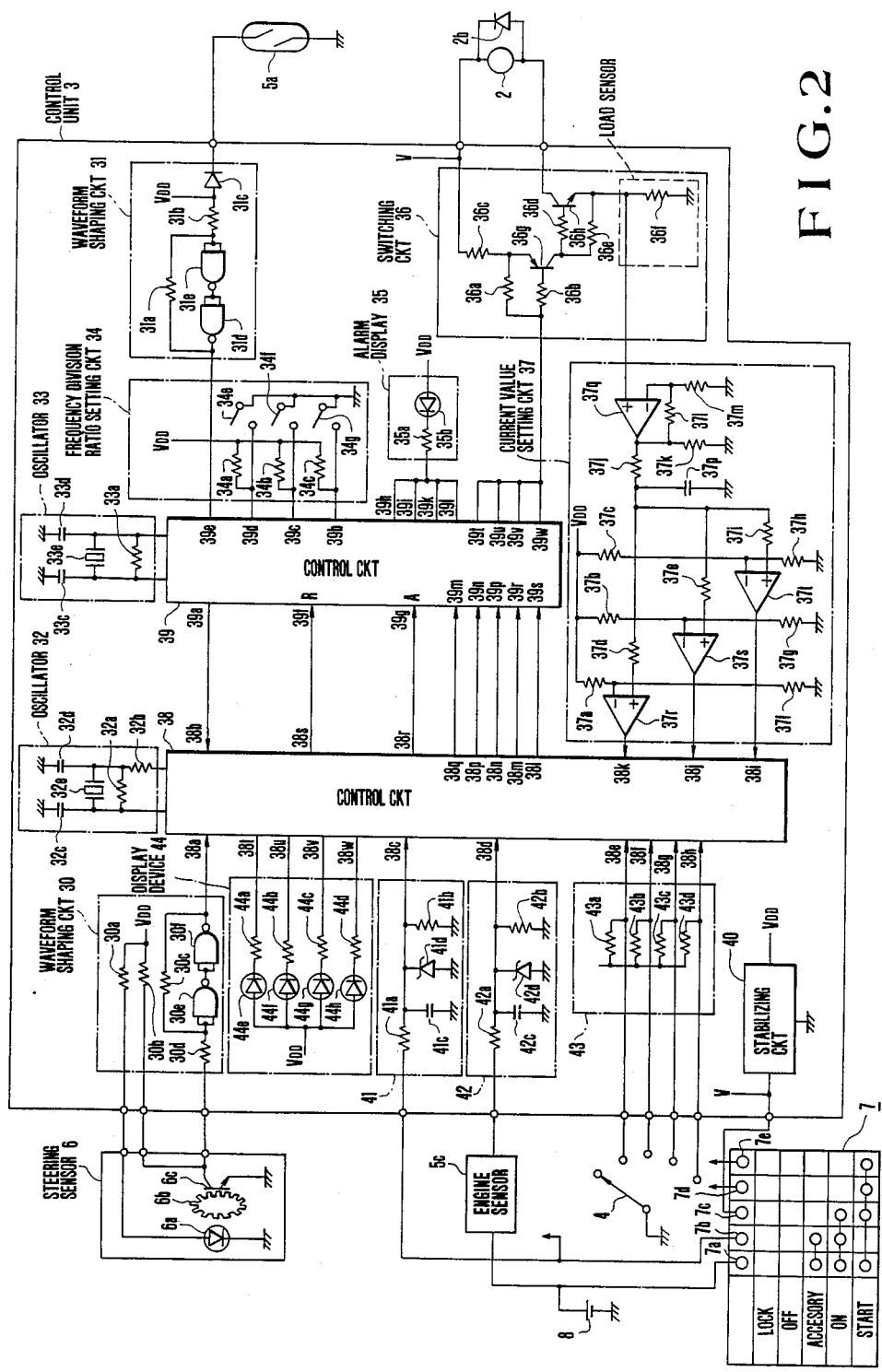
FIG. 2 is a connection diagram showing the detail of the control unit shown in FIG. 1.

As shown in FIG. 2, the steering sensor 6 is constituted by a luminous diode 6a, a circular disc 6b provided with slits and a phototransistor 6c so as to produce a number of pulses proportional to the amount of steering. The engine sensor 5c is constructed to produce the voltage of the battery 8 when the engine operates. A diode 2b is connected in parallel with the motor 2 for absorbing the transient voltage of the motor 2. The control unit 3 is constituted by waveform shaping circuits 30 and 31, oscillators 32 and 33, a frequency division ratio setting circuit 34, an alarm display device 35, a switching circuit 36, a current value setting circuit 37, control circuits 38 and 39, stabilizing circuits 40, 41 and 42, a pull-up circuit 43 and a display device 44 displaying the steering mode.

The waveform shaping circuit 30 comprises resistors 30a to 30d, and NAND gate circuits 30e and 30f, while the waveform shaping circuit 31 comprises resistors 31a and 31b, a diode 31c and NAND gate circuits 31a and 31e. The oscillator 32 comprises resistors 32a and 32b, capacitors 32c and 32d and a ceramic oscillator 32e, while the oscillator 33 comprises a resistor 33a, capacitors 33c and 33d, and a ceramic oscillator 33. The frequency division ratio setting circuit 34 is constituted by resistors 34a to 34c, and switches 34e to 34g. Since the number of pulses generated by the speed sensor 5a per unit running distance may vary according to the type of the car, the frequency division ratio of a frequency division circuit incorporated into the control circuit 39 is controlled by suitably setting switches 34e to 34g so that the number of pulses sent out from a terminal 39a per unit running distance would not vary depending upon the type of the car. The alarm display device 35 is constituted by a resistor 35a and a luminous diode 35b, while the switching circuit 36 is constituted by reisstors 36a to 36f, and transistors 36g and 36h. Resistor 36f acts as a load sensor. The current value setting circuit 37 is constituted by resistors 37a to 37m, a capacitor 37p, an amplifier 37q, and comparators 37r to 37t so as to judge that the current flowing through the motor 2 exceeds which one of predetermined set valves of three types. The control circuit 38 performs processing to be described later in accordance with signals supplied to its terminals 38a to 38k for sending out 5 bit parallel signals corresponding to input signals through output terminals 38l to 38q. If desired, the control circuit 38 sends out an alarm signal and a reset signal through terminals 38r and 38s, and also sends out a zero level signal for displaying the steering mode through either one of the terminals 38t to 38w. As above described, the control circuit 39 divides the frequency of a signal supplied to the terminal 39e with a frequency division ratio corresponding to signals supplied to terminals 39b to 39d for supplying the frequency divisioned signal to the terminal 39a. When a signal is inputted to the terminal 39f, the control circuit 39 is reset, whereas when a signal is supplied to terminal 39g, the control circuit 38 produces zero level signals at terminals 39b to 39l. Also the control circuit 39 supplies to the terminals 39t to 39w signals whose duty ratios vary in accordance with signals supplied to terminals 39m to 39s. Stabilizing circuits 40 to 42 are constructed to output applied voltage as a stabilized 5 V voltage. The stabilizing circuit 41 is constituted by resistors 41a and 41b, a capacitor 41c, and a Zener diode 41d, while the stabilizing circuit 42 is constituted by resistors 42a and 42b, a capacitor 42c, and a Zener diode 42d. The pull up circuit 43 is constituted by resistors 43a to 43d. The display device 44 is constituted by resistors 44a to 44d, and luminous diodes 44e to 44h so as to display steering modes automatically selected by the switch 4 or the control circuit 38 which is constructed to preferentially display a steering mode selected by the switch 4.

The switch 7 is provided with lock, OFF, ACCESSARY, ON and START positions. At the ACCESSORY position, terminals 7a and 7b are short-circuited, while at the ON position, terminals 7a, 7b and 7c are short-circuited. At the START position, terminals 7a, 7c, 7d and 7e are short-circuited. The terminal 7b is connected to such electric devices as radio receiving set and meters, not shown, while terminals 7c to 7e are connected to a source circuit for the engine. The control circuit 38 contains a circuit generating a quasi signal (or test signal) for testing the power steering device when an electric power is supplied, the quasi signal being sent out from the terminals 38l to 38q when an "1" level signal is supplied to either one or both of terminals 38c and 38d. During an interval in which the quasi signal is generated, an alarm signal is sent out through the terminal 38r. When the current flowing through the motor 2 exceeds 5 amperes, generation and sending out of the quasi signal are interrupted.

Figure 3:
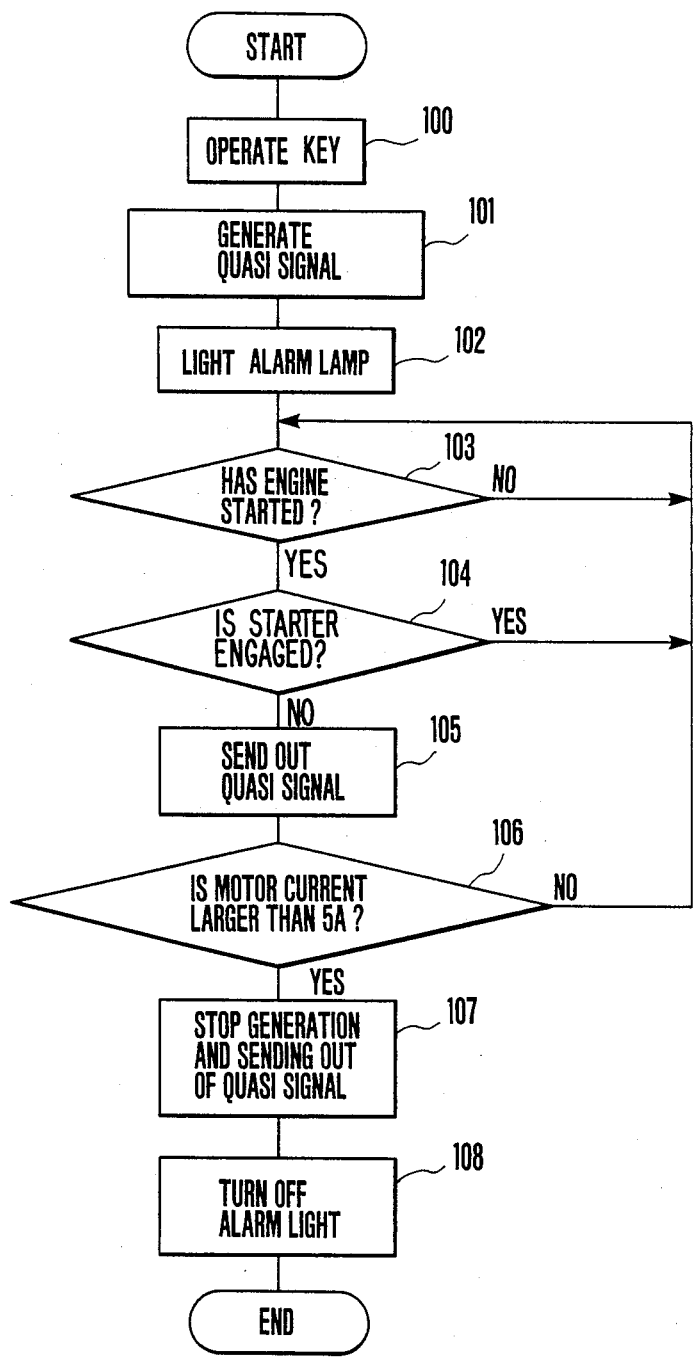
FIG. 3 is a flow chart for explaining successive steps of the method of this invention.

The operation of the circuit constructed as above described will be described with reference to a flow chart shown in FIG. 3. More particularly, at step 100 the key is operated. As the ignition switch 7 is operated up to the ON position, at steps 101 and 102, processings of the quasi signal generation and alarm light ON are executed. As a consequence, the alarm signal sent out from the terminal 38r of controller 38 is supplied to the luminous diode 35b via control circuit 39 and resistor 35a so that the luminous diode 35b acting as an alarm lamp operates. Although a quasi signal is generated in the control circuit 38, at this time, since a "1" level signal is not supplied to terminal 38d, the quasi signal would not be sent out from the control circuit 38, whereby the motor 2 would not operate.

When a driver turns the ignition switch 7 to the START position, a starter, not shown, is started. However, before starting the engine, the result of judgment at step 103 is NO. But when the engine is started, as the engine sensor 5c produces an "1" level signal, the result of judgment at step 103 becomes YES.

Even when the engine is started, so long as the driver holds the ignition switch 7 at the START position, since no "1" level signal is supplied to terminal 38c, the result of judgment executed at step 104 as to whether the starter has operated or not is YES, whereby the program circulates through steps 103 and 104. However, when the ignition switch 7 is returned to the ON position, an "1" level signal is supplied to terminal 38c so that the result of judgment executed at step 104 becomes NO, with the result that at step 105, the quasi signal generated in the control circuit 38 is sent out through terminals 38l to 38q. Since the quasi signal is supplied to the switching circuit 36 through the control circuit 39, the motor 2 begins to operate.

While the current flowing through the motor 2 is less than 5A, the result of judgment executed at step 106 as to whether the motor current is larger than 5A is NO so that the program is circulated through steps 103 to 106 for sending out the quasi signal at each circulation. As the motor current exceeds 5A the result of judgment at step 106 becomes YES so that a step 107, the control circuit 38 stops generation and sending out of the quasi signal, thus interrupting the motor current. At this time, since the control circuit 38 stops sending out the alarm signal through the terminal 38r, the luminous diode 35 is turned OFF at step 108.

As above described, according to this invention, since a quasi signal is temporarily generated for operating motor 2, the alarm lamp would not be turned OFF when the power steering device is faulty, thus enabling judgment of fault.

At step 108, the control circuit 38 completes its confirmation operation and thereafter begins its normal operation so as to provide an automatic steering commensurate with the running condition. Furthermore, as the judgment as to whether the power steering device is faulty or not is executed depending upon the result of judgment as to whether the motor current is higher than 5A or not. It should be understood that the current value can be selected to any value suitable to the capacity of the device. The judgment as to whether the starter is operating or not can be made by utilizing a signal from a starter sensor or a starter relay.

As above described according to the method and apparatus for confirming the operation of the power steering device embodying the invention, prior to the commencement of running an electric motor for driving an oil pump is temporarily started and the operation of the power steering device is confirmed in accordance with the magnitude of the motor current, it is possible to determine whether the power steering device is faulty or not before starting a car. Consequently, the driver can run the car according to the result of judgment thus ensuring safe running.

While a preferred embodiment of the invention has been described using specific terms, such description is for illustrative purposes only, and it is to be understood that changes and variations may be made without departing from the spirit or scope of the following claims.

Figure 4:
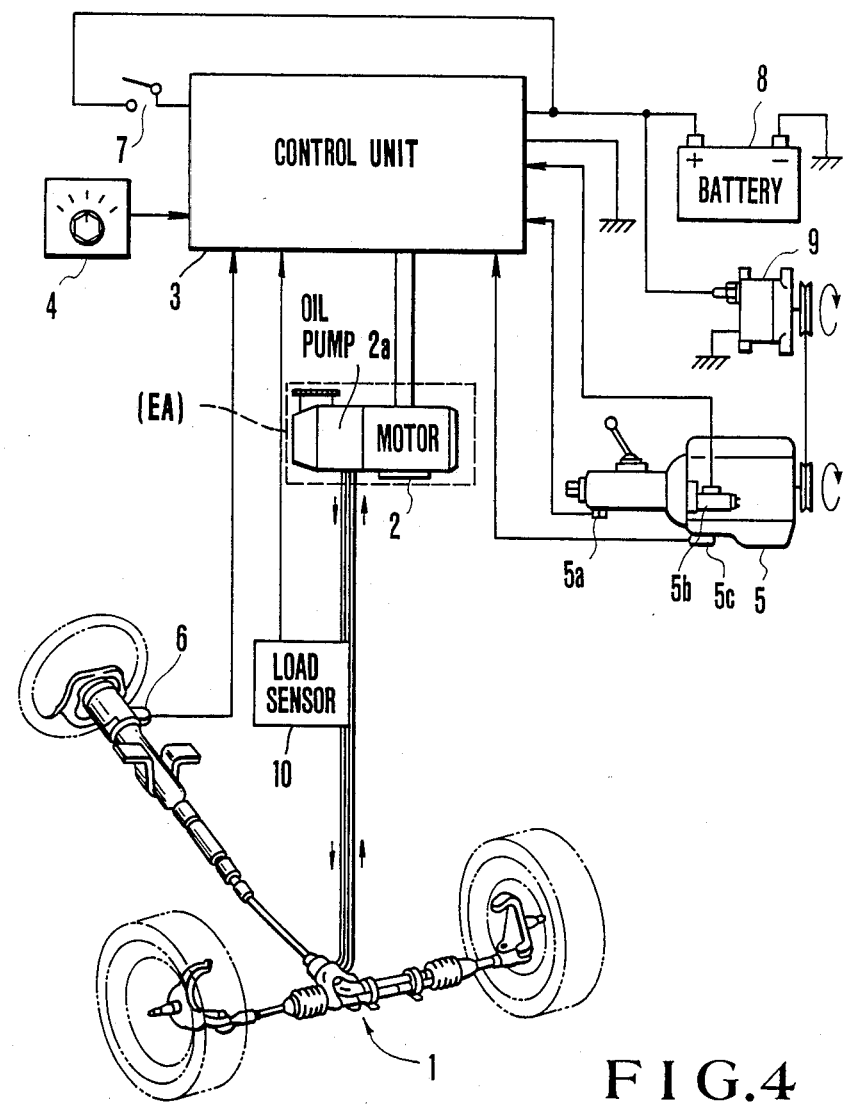
FIGS. 4 and 5 are diagrammatic representations showing modified embodiments of this invention.
Figure 5:
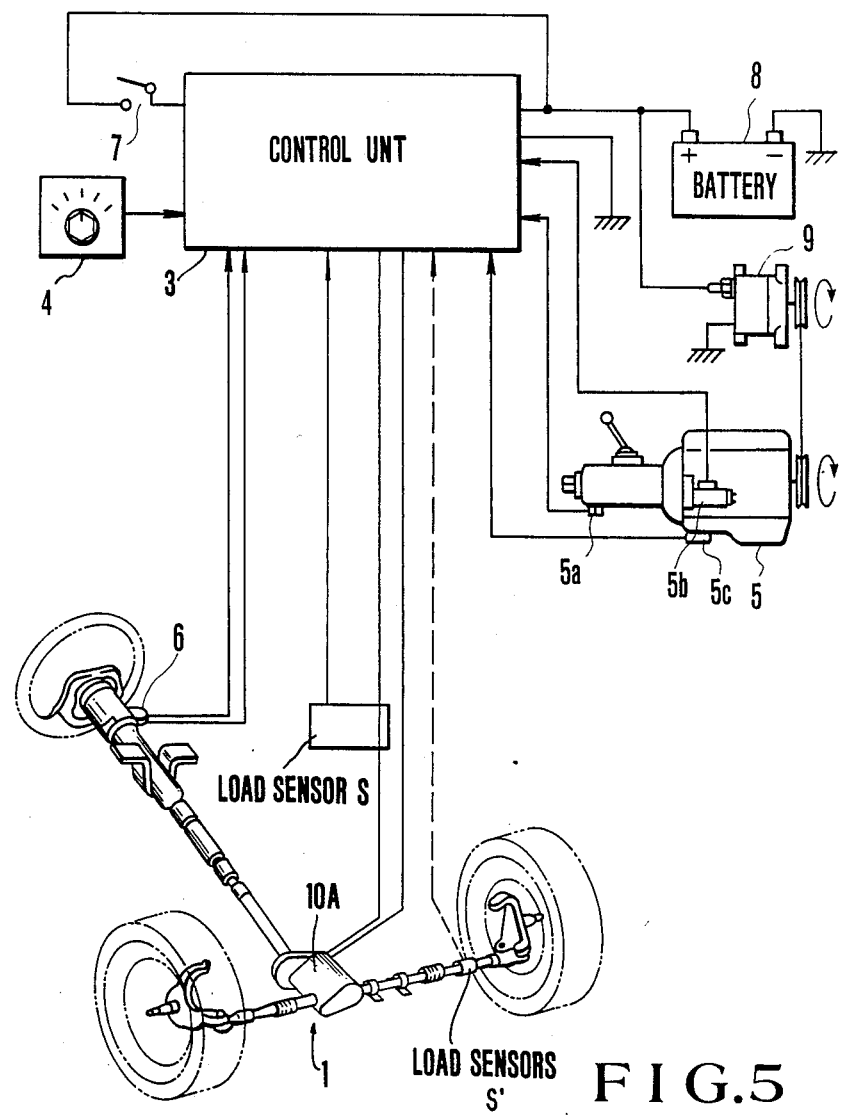

For example, although in the foregoing embodiment the state change of the power steering device was detected by detecting the current flowing through a motor for driving an oil pump, the same object can be attained by detecting variation in the oil pressure outputted by oil pump 2a with a load sensor 10 connected in an oil passage between the oil pump 2a and the steering device 1, as shown in FIG. 4. In this case, the flow chart shown in FIG. 3 is changed such that at step 106 a judgement is made as to whether the load is adequate or not. Furthermore, the electric actuator may be constituted by directly coupling an electric motor 10A to the steering mechanism 1 as shown in FIG. 5. Such construction is described in French Pat. No. 81 11134 and Japanese Preliminary Publication No. Sho 58-53562 so that its detail will not be described herein. In the direct motor drive system shown in FIG. 5, the load sensor 5 detecting the motor current is different from the foregoing embodiment in that it is positioned on the outside of the control unit 3.

Furthermore, in FIG. 5, as another example of the load sensor is shown a strain gauge S' positioned at an intermediate point of the link of a steering mechanism. Whether the steering device is normal or faulty is judged by passing electric current to motor, detecting the load of the steering mechanism with the strain gauge and then judging the magnitude of the detected strain. The operation of the control unit 3 shown in FIG. 5 is similar to those shown in FIGS. 1 and 4. The only difference lies in that the content of step 106 shown in FIG. 3 is more or less changed by the load sensor used. For example, where the load sensor S is used at step 106 a judgement is made as to whether there is a load or not or whether the load is larger than a predetermined value or not. This is true where the load sensor S' is used.

What is claimed is:

1. A method of confirming an operating condition of a power steering device for use in an engine powered motor car having a starter motor, said power steering device being of the type including a steering mechanism driven by an electric actuator, the method comprising the steps of:
   supplying a test current to said electric actuator after the engine has started and the starter motor is disengaged;
   confirming whether the power steering device operates normally or not in accordance with a state variation of said power steering device caused by said test current, said state variation being a variation in electric current flowing through said electric actuator; and
   stopping generation of said test current when said state variation is normal and when normal operation of said power steering device is commenced.

2. A power steering apparatus of an engine powered motor car having a starter motor and provided with a steering mechanism driven by an electric actuator comprising:
   control means for supplying test current to said actuator after the engine has started and the starter motor is disengaged for testing said power steering apparatus;
   means for confirming whether said power steering apparatus operates correctly or not in accordance with state variation of said power steering apparatus caused by said test current, said state variation of said steering apparatus being detected by a load sensor detecting variation in current flowing through said electric actuator.

3. The apparatus according to claim 2 wherein said electric actuator comprises an electric motor and an oil pump driven by said electric motor for supplying presurized oil to said steering mechanism.

4. The apparatus according to claim 2 wherein said electric actuator comprises
   an electric motor directly coupled to said steering mechanism.

5. The apparatus according to claim 2 which further comprises alarm means operated when said test current is supplied to said electric actuator and means rendering said alarm means inoperative when said state variation of said power steering apparatus is normal.

6. A method of confirming an operating condition of a power steering device for use in an engine powered motor car having a starter motor and provided with a steering mechanism driven by an electric actuator, the method comprising the steps of:
   supplying a test current to said electric actuator after the engine has started and the starter motor is disengaged;
   confirming whether the power steering device operates normally or not in accordance with a state variation of said power steering device caused by said test current, said state variation being detected by a strain gauge mounted on a steering link of said steering mechanism; and
   stopping generation of said test current when said state variation is normal and when normal operation of said power steering device is commenced.

7. A method of confirming an operating condition of a power steering device for use in an engine powered motor car having a starter motor and provided with a steering mechanism driven by an electric actuator, the method comprising the steps of:
   supplying a test current to said electric actuator after the engine has started and the starter motor is disengaged;
   confirming whether the power steering device operates normally or not in accordance with a state variation of said power steering device caused by said test current, said state variation being represented by variation in oil pressure discharged from an oil pump comprising said electric actuator; and
   stopping generation of said test current when said state variation is normal and when normal operation of said power steering device is commenced.

8. A power steering apparatus of an engine powered motor car having a starter motor and provided with a steering mechanism driven by an electric actuator, said actuator including an electric motor and an oil pump driven by said electric motor for supplying pressurized oil to said steering mechanism, comprising:
   control means for supplying test current to said actuator after the engine has started and the starter motor is disengaged for testing said power steering apparatus; and
   means for confirming whether said power steering apparatus operates correctly or not in accordance with state variation of said power steering apparatus caused by said test current, said state variation of said steering apparatus being detected by a load sensor detecting variation in pressure of oil discharged by said oil pump.

9. The apparatus according to claim 8 which further comprises alarm means operated when said test current is supplied to said electric actuator and means rendering said alarm means inoperative when said state variation of said power steering apparatus is normal.

10. A power steering apparatus of an engine powered motor car having a starter motor and provided with a steering mechanism driven by an electric actuator, said electric actuator comprising an electric motor directly coupled to said steering mechanism, comprising:
   control means for supplying test current to said actuator after the engine has started and the starter motor is disengaged for testing said power steering apparatus;
   means for confirming whether said power steering apparatus operates correctly or not in accordance with state variation of said power steering apparatus caused by said test current, said state variation of said power steering apparatus being detected by a load sensor in the form of a strain gauge mounted on a steering link of a steering mechanism.

11. A power steering apparatus of an engine powered motor car having a starter motor and provided with a steering mechanism driven by an electric actuator comprising:
 control means for supplying test current to said actuator after the engine has started and the starter motor is disengaged for testing said power steering apparatus;
 means for confirming whether said power steering apparatus operates correctly or not in accordance with state variation of said power steering apparatus caused by said test current, said state variation of said power steering apparatus being detected by a load sensor in the form of a strain gauge mounted on a steering link of a steering mechanism.

12. The apparatus according to claim 11 wherein said electric actuator comprises an electric motor and an oil pump driven by said electric motor for supplying pressurized oil to said steering mechanism.

13. The apparatus according to claim 12 wherein said electric actuator comprises:
 an electric motor directly coupled to said steering mechanism.

14. The apparatus according to claim 13 which further comprises alarm means operated when said test current is supplied to said electric actuator and means rendering said alarm means in operative when said state variation of said power steering apparatus is normal.

* * * * *